July 24, 1962

L. E. PAXTON 3,046,049

AUTOMOBILE HAT RACK

Filed Dec. 20, 1960

Lawrence E. Paxton
INVENTOR.

United States Patent Office 3,046,049
Patented July 24, 1962

3,046,049
AUTOMOBILE HAT RACK
Lawrence E. Paxton, 16 Wells Ave. NW.,
Roanoke 17, Va.
Filed Dec. 20, 1960, Ser. No. 77,169
2 Claims. (Cl. 296—97)

The present invention generally relates to new and useful improvements in hat racks or holders and has for its primary object to provide, in a manner as hereinafter set forth, novel means for supporting a hat in an out-of-the-way but readily accessible location in a motor vehicle.

Another very important object of the present invention is to provide a hat rack of the aforementioned character which is adapted to be firmly and expeditiously secured for use in an automobile through the medium of the usual sun visor holder of the vehicle.

Other objects of the invention are to provide an automobile hat rack or holder of the character set forth which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
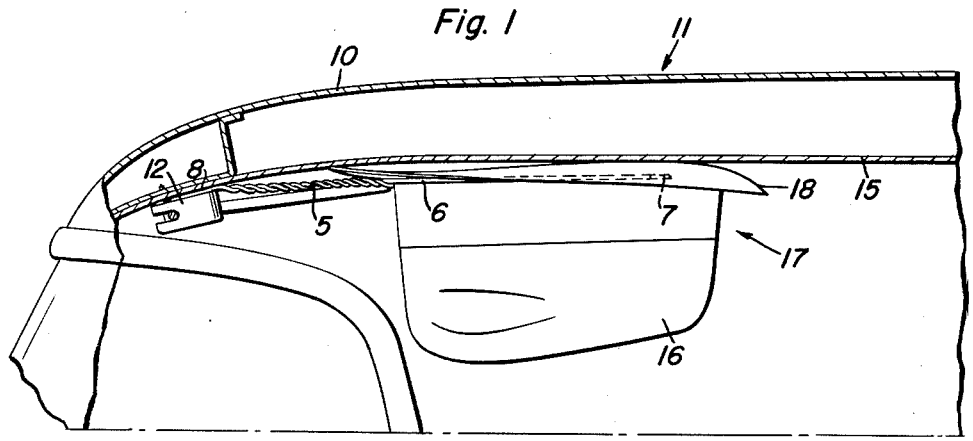
FIGURE 1 is a view in vertical longitudinal section through the front portion of an automobile top structure, showing a hat rack embodying the present invention in use therein.
Figure 2:
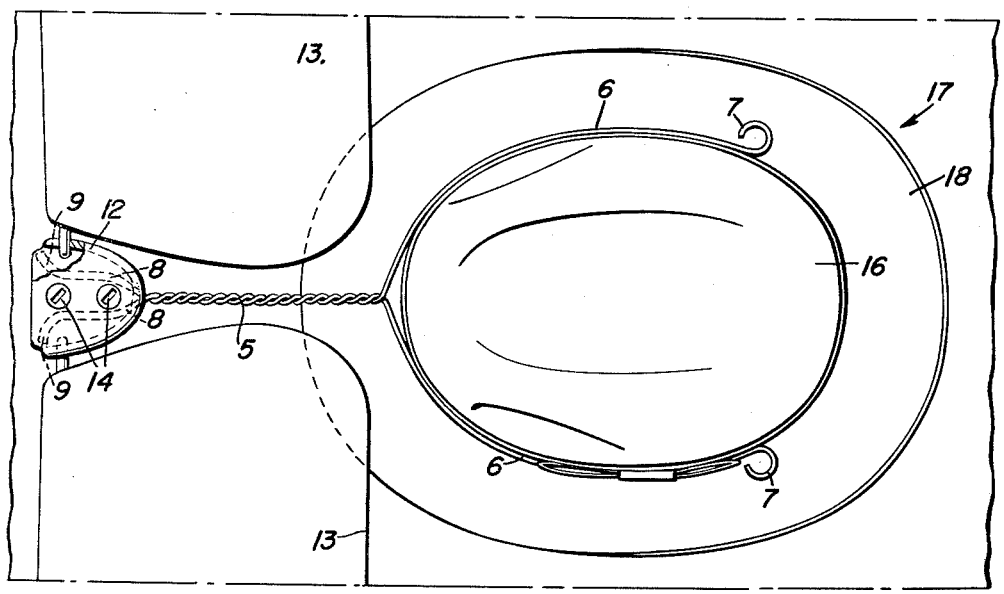
FIGURE 2 is a bottom plan view thereof.

Referring now to the drawing in detail, it will be seen that the embodiment of the invention which has been illustrated comprises a pair of duplicate resilient wires 4 of suitable gauge. Of course, the wires 4 may also be of any desired length.

Figure 3:
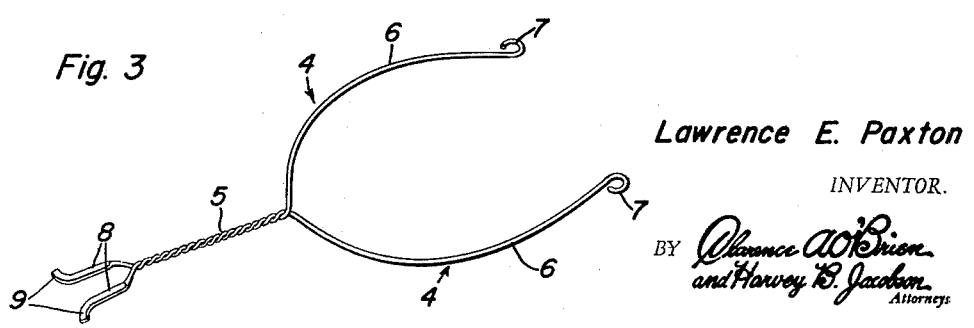
FIGURE 3 is a perspective view of the device per se.

As shown to advantage in FIGURE 3 of the drawing, intermediate portions of the wires 4 are twisted together in a manner to provide a relatively rigid stem or arm 5. From one end of the arm 5, the wires 4 are curved outwardly and then inwardly in a manner to provide a pair of spaced, oppositely curved legs 6. At their free ends, the legs 6 terminate in reversely curved loops 7.

At the other end of the arm 5, the wires 4 are spread and flattened in a manner to provide spaced fingers 8 which terminate in laterally outwardly curved free end portions 9.

The device is adapted to be installed for use beneath the front portion of the roof 10 of a motor vehicle 11 through the medium of the usual holder 12 for the inner ends of the visors 13 of said vehicle. The securing screws 14 of the holder 12 are removed to permit the fingers 8 of the hat rack to be positioned. Or, the screws 14 may simply be loosened sufficiently to permit insertion of the fingers 8 between the visor holder 12 and the opposed surface of the vehicle body 10, after which said screws are again tightened. The flattened fingers 8 with the laterally curved free end portions 9 define a fork which is adapted to straddle the screws 14. Thus, the device is firmly secured in position for use in the upper portion of the vehicle adjacent the head liner 15. The outwardly bowed legs 6 of the device define a resilient yoke for the reception of the crown 16 of an inverted hat 17. The brim 18 of the hat 17 rests on the legs 6. The outwardly and reversely curved loops or eyes 7 on the free ends of the legs 6 facilitate insertion of the hat 17 in an obvious manner.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In combination, a vehicle body including a top, a pair of adjustable, transversely aligned sun visors mounted beneath the top, a holder mounted beneath the top between the visors for detachably securing the inner ends thereof to said top, and a hat rack secured between the holder and the top for removably mounting said rack beneath said top, said holder comprising a generally flat, apertured plate-like member and screws securing said member to the top, said rack including an arm, a yoke on one end of said arm for the reception of a hat, and a fork on the other end of the arm engaged between the member and the top astraddle the screws for mounting said member beneath said top and positively retaining said member against rotation.

2. The combination of claim 1, wherein said rack further includes a pair of resilient wires having intermediate portions twisted together to provide the arm, said fork comprising flattened legs receiving the screws therebetween and terminating in outwardly curved free end portions.

References Cited in the file of this patent

UNITED STATES PATENTS

| | | |
|---|---|---|
| 939,352 | Truitt | Nov. 9, 1909 |
| 1,402,800 | Sands | Jan. 10, 1922 |
| 1,465,026 | Smith | Aug. 14, 1923 |
| 1,576,452 | Noonan | Mar. 9, 1926 |
| 1,599,183 | Phillips | Sept. 7, 1926 |
| 1,658,152 | Yoder | Feb. 7, 1928 |
| 2,079,948 | Neale | May 11, 1937 |
| 2,163,340 | Jacobs | June 20, 1939 |
| 2,189,538 | Van Pelt | Feb. 6, 1940 |
| 2,681,824 | Knoblock | June 22, 1954 |